US009074059B2

(12) United States Patent
Harada et al.

(10) Patent No.: US 9,074,059 B2
(45) Date of Patent: Jul. 7, 2015

(54) EXPANDABLE BEADS HAVING FLAME RETARDANCY OF V-0 OR V-1, AND MOLDED BODY USING THE SAME

(75) Inventors: Shoichiro Harada, Tokyo (JP); Yumiko Oki, Tokyo (JP); Shoichi Takaishi, Tokyo (JP); Takeshi Fujisawa, Tokyo (JP); Tadayuki Ishii, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 427 days.

(21) Appl. No.: 13/389,453

(22) PCT Filed: Aug. 11, 2010

(86) PCT No.: PCT/JP2010/063645
§ 371 (c)(1),
(2), (4) Date: Feb. 8, 2012

(87) PCT Pub. No.: WO2011/019057
PCT Pub. Date: Feb. 17, 2011

(65) Prior Publication Data
US 2012/0141794 A1 Jun. 7, 2012

(30) Foreign Application Priority Data

Aug. 13, 2009 (JP) .................. 2009-187767
Oct. 30, 2009 (JP) .................. 2009-250858
Jun. 17, 2010 (JP) .................. 2010-138370

(51) Int. Cl.
| | |
|---|---|
| *B32B 5/16* | (2006.01) |
| *C08J 9/16* | (2006.01) |
| *C08J 9/18* | (2006.01) |
| *B29C 44/44* | (2006.01) |
| *C08J 9/00* | (2006.01) |
| *C08J 9/12* | (2006.01) |
| *C08J 9/228* | (2006.01) |

(52) U.S. Cl.
CPC .............. *C08J 9/18* (2013.01); *Y10T 428/2982* (2015.01); *B29C 44/445* (2013.01); *C08J 9/0038* (2013.01); *C08J 9/122* (2013.01); *C08J 9/228* (2013.01); *C08J 2203/06* (2013.01); *C08J 2367/00* (2013.01); *C08J 2371/12* (2013.01); *C08J 2425/06* (2013.01)

(58) Field of Classification Search
CPC ............. C01P 2004/60; C01P 2006/10; C01P 2006/90
USPC .......... 428/402; 521/56, 59; 525/192
See application file for complete search history.

(56) References Cited

U.S. PATENT DOCUMENTS

| | | | |
|---|---|---|---|
| 4,727,093 A | 2/1988 | Allen et al. | |
| 4,791,145 A * | 12/1988 | Pressman | 521/98 |
| 4,857,390 A * | 8/1989 | Allen et al. | 428/220 |
| 4,927,859 A * | 5/1990 | Weber et al. | 521/59 |
| 5,064,869 A * | 11/1991 | Bopp et al. | 521/60 |
| 5,091,256 A | 2/1992 | Bopp et al. | |
| 5,169,876 A | 12/1992 | Heitmann et al. | |
| 5,200,432 A | 4/1993 | Bopp et al. | |
| 5,389,320 A * | 2/1995 | Martynowicz | 264/53 |
| 5,442,041 A * | 8/1995 | Mallikarjun et al. | 528/483 |
| 5,506,276 A * | 4/1996 | Martynowicz | 521/60 |
| 2004/0220289 A1 | 11/2004 | Saito | |
| 2006/0025490 A1 | 2/2006 | Saito | |
| 2006/0276558 A1* | 12/2006 | Petela et al. | 521/56 |
| 2007/0112082 A1* | 5/2007 | Hahn et al. | 521/60 |
| 2007/0117904 A1 | 5/2007 | Muylem et al. | |
| 2007/0135538 A1* | 6/2007 | Ihara et al. | 524/106 |
| 2007/0173569 A1 | 7/2007 | Onishi et al. | |
| 2009/0156700 A1* | 6/2009 | Oikawa et al. | 521/56 |

FOREIGN PATENT DOCUMENTS

| | | |
|---|---|---|
| CN | 1551898 | 12/2004 |
| DE | 39 09 017 | 4/1990 |
| EP | 0265788 | 5/1988 |
| EP | 0 436 847 | 7/1991 |
| JP | 46-38359 | 11/1971 |
| JP | 51-22951 | 7/1976 |
| JP | 52-101268 | 8/1977 |
| JP | 63-150337 | 6/1988 |
| JP | 4-122741 | 4/1992 |
| JP | 4-46217 | 7/1992 |
| JP | 4-214761 | 8/1992 |
| JP | 4-372630 | 12/1992 |
| JP | 5-214151 | 8/1993 |
| JP | 5-262909 | 10/1993 |
| JP | 6-22919 | 3/1994 |
| JP | 6-49795 | 6/1994 |
| JP | 11-29687 | 2/1999 |
| JP | 2000-95892 | 4/2000 |
| JP | 2003-138051 | 5/2003 |
| JP | 2005-272646 | 10/2005 |
| JP | 2006-297638 | 11/2006 |
| JP | 2007-514027 | 5/2007 |
| JP | 2007-514851 | 6/2007 |
| KR | 10-2004-0014519 | 2/2004 |
| KR | 10-2007-0100288 | 10/2007 |
| WO | 03/004552 | 1/2003 |

OTHER PUBLICATIONS

Korea Office action, mail date is Jul. 26, 2013.
European Office Action issue with respect to counterpart European Application No. 10808240.5, dated Aug. 8, 2012.
Search report from International Application No. PCT/JP2010/063645 (English), mail date is Oct. 19, 2010.
English translation of International Preliminary Report on Patentability and Written Opinion for International Application No. PCT/JP2010/063645, mail date is Mar. 22, 2012.
European Search Report issued with respect to counterpart European Application No. 10808240.5, dated Jul. 19, 2012.

* cited by examiner

*Primary Examiner* — Holly Le
(74) *Attorney, Agent, or Firm* — Greenblum & Bernstein, P.L.C.

(57) ABSTRACT

The present invention provides expandable beads having an average particle size of 0.5 to 10 mm, a density of 0.033 to 0.80 g/cc, and a flame retardancy of V-0 or V-1 as measured according to the UL-94 vertical test (20 mm vertical burn test) in the UL standards.

9 Claims, No Drawings

EXPANDABLE BEADS HAVING FLAME RETARDANCY OF V-0 OR V-1, AND MOLDED BODY USING THE SAME

TECHNICAL FIELD

The present invention relates to expandable beads, a molded body, and a production method for the molded body.

BACKGROUND ART

Plastics and metals have been conventionally employed as materials for internal parts of automobiles or electronics devices. Although use applications of the plastics to electronics devices, general merchandises, and automobile parts or the like have been expanded because the plastics are lighter than the metals and the like, lighter materials having excellent properties such as strength and shock resistance are required in terms of energy saving or the like. One of such materials is a resin expanded molded body.

A resin expanded molded body obtained by foaming a blend resin of a polystyrene resin and a polyphenylene ether resin has been known as an example (Patent Literatures 1 and 2). Flame-retardant expandable beads to which flame retardancy is given by adding a flame retardant have been known (Patent Literatures 3 and 4).

CITATION LIST

Patent Literature

[Patent Literature 1] Japanese Patent Application Laid-Open No. 52-101268
[Patent Literature 2] Japanese Patent Application Laid-Open No.
[Patent Literature 3] Japanese Patent Application Laid-Open No. 2000-95892
[Patent Literature 4] National Re-publication of International Patent Application No. 2003-004552

SUMMARY OF INVENTION

Problems to be Solved by the Invention

However, although weight reduction is satisfied by using the resin expanded molded bodies as in Patent Literatures 1 to 4, the expanded bodies containing a large amount of air, which are apt to burn, cannot be applied to the electronics devices and the automobile parts requiring flame retardancy, and therefore, the resin expanded molded bodies have not been hitherto employed. On the other hand, because conventional unexpanded plastics and metals do not satisfy weight reduction and are hard, the unexpanded plastics and metals are unsuitable for processing into a fine and complicated shape requiring flexibility, and weight reduction and improvement in flame retardancy have had hitherto a trade-off relationship.

Although an unexpanded resin exhibits excellent flame retardancy when using a flame retardant to achieve both weight reduction and improvement in flame retardancy, flame retardancy is remarkably reduced when using the flame retardant for the expanded body. Because the expanded body has a resin amount per unit volume smaller than that of the resin when comparing samples having the same size, the expanded body is hard to form a carbonization layer and lengthen a burn time. Because the expanded body has a resin amount smaller than that of the unexpanded resin, the expanded body is apt to be softened by burn heat, and as a result, the resin dripping during burning is apt to be generated.

On the other hand, although flame retardancy is improved when an amount of a flame retardant to be added to the expanded body is increased for improvement in flame retardancy, mechanical properties are reduced; heat resistance is reduced for by a flame retardant which is effective in plasticizing the resin; or adverse effects such as blocking of an expanding property are caused by reduction in elongational viscosity. Therefore, it is very difficult to facilitate not only molding processability into a molded body but also processing into a complicated and fine shape, and to simultaneously satisfy weight reduction and improvement in flame retardancy.

It is an object of the present invention to provide expandable beads maintaining excellent flame retardancy simultaneously with weight reduction and having excellent molding processability.

Means for Solving the Problems

The present invention is the following [1] to [12].
[1] Expandable beads having an average particle size of 0.5 to 10 mm, a density of 0.033 to 0.80 g/cc, and flame retardancy of V-0 or V-1 as measured according to the UL-94 vertical test (20 mm vertical burn test) in the UL standards.
[2] The expandable beads according to [1] described above, wherein a residual concentration of an aliphatic hydrocarbon gas is equal to or less than 1000 ppm by volume.
[3] The expandable beads according to [1] or [2] described above, wherein the expandable beads comprises a base material resin comprising a polyphenylene ether resin or a polycarbonate resin, and a flame retardant.
[4] The expandable beads according to any one of [1] to [3] described above, wherein the expandable beads comprises a base material resin comprising a polyphenylene ether resin and a flame retardant.
[5] The expandable beads according to [3] or [4] described above, wherein the base material resin further comprises a polystyrene resin.
[6] The expandable beads according to any one of [3] to [5] described above, wherein the base material resin further comprises a rubber component.
[7] The expandable beads according to any one of [3] to [6] described above, wherein the base material resin comprises 40 to 94% by mass of the polyphenylene ether resin, 5 to 20% by mass of the flame retardant, 0.3 to 10% by mass of the rubber component, and the rest being the polystyrene resin.
[8] The expandable beads according to any one of [3] to [7] described above, wherein the flame retardant is a non-halogen based flame retardant.
[9] The expandable beads according to any one of [1] to [8] described above, wherein a closed cell ratio is equal to or greater than 50%.
[10] A resin expanded molded body using expandable beads according to any one of [1] to [9] described above.
[11] A production method for a molded body comprising:
an impregnating step of holding a base material resin comprising 94% by mass of a polyphenylene ether resin, 5 to 20% by mass of a flame retardant, 0.3 to 10% by mass of a rubber component, and the rest being a polystyrene resin under an carbon dioxide atmosphere having a high-pressure state of less than a critical pressure to impregnate the base material resin with carbon dioxide;
an expanding step of heating the base material resin impregnated with carbon dioxide to form expandable beads; and
a molding-expanding step of filling a desired molding die with the expandable beads and reheating the expandable beads to obtain a molded body.

[12] The production method for a molded body according to [11] described above further comprising a pressurizing step of pressurizing the expandable beads under an inorganic gas atmosphere between the expanding step and the molding step.

Effects of Invention

The present invention can provide expandable beads which have excellent flame retardancy adapting to the UL-94 as the burn standards of an unexpanded resin simultaneously with weight reduction, exhibit excellent molding processability to a molded body, and is easily processed into a fine and complicated shape and a molded body using the same.

The molded body obtained from the expandable beads of the present invention has excellent heat resistance and flame retardancy, and an object of the molded body is to provide products and members having a complicated shape which cannot be easily achieved by metals or unexpanded resins hitherto, for example, a chassis for devices such as an electronic device enabling a greatly simplified assembly, automobile members and constructional materials for OA equipment, or the like, with sufficient accuracy of dimension also under a high-temperature environment.

EMBODIMENTS FOR CARRYING OUT THE INVENTION

Hereinafter, the present invention will be specifically described. The present invention is not limited to the following embodiments, and many variations may be made within the spirit and scope of the present invention.

The expandable beads of the present invention have an average particle size of 0.5 to 10 mm, a density of 0.033 to 0.80 g/cc, and a flame retardancy of V-1 or greater (V-0 or V-1) as measured according to the UL-94 vertical test (20 mm vertical burn test) in the UL standards.

The average particle size of the expandable beads is 0.5 to 10 mm, and preferably 0.7 to 5 mm. When the average particle size is greater than 10 mm, filling failure is apt to be generated in molding a resin expanded molded body having a complicated and fine shape, which complicates molding. On the other hand, when the average particle size is less than 0.5 mm, an expanding agent is apt to be scattered from particles, which complicates expanding.

The density of the expandable beads is preferably 0.033 to 0.80 g/cc, more preferably 0.04 to 0.67 g/cc, and still more preferably 0.05 to 0.5 g/cc. When the density of the expandable beads is greater than 0.80 g/cc, the expandable beads cannot satisfy weight reduction, are hardly molded into a complicated and fine shape, and have an insufficient heat quantity during molding, which complicates molding. On the other hand, when the density is less than 0.033 g/cc, the expandable beads cannot satisfy desired flame retardancy.

Although an expanding magnification of the expandable beads is not particularly limited, the expanding magnification is preferably 1.5 to 30 cc/g, and more preferably 2 to 20 cc/g. When the expanding magnification is in a range of 1.5 to 30 cc/g, excellent flame retardancy tends to be likely to be maintained while making a merit of weight reduction. A primary expanding magnification is preferably 1.4 to 10 cc/g when adjusting the expanding magnification to a desired value in multiple stages. When the primary expanding magnification is in this range, a cell size is apt to be uniformed, and a secondary expanding activity is also likely to be applied.

A closed cell ratio of the expandable beads is desirably high, preferably equal to or greater than 50%, and more preferably equal to or greater than 60%. When the closed cell ratio is equal to or greater than 50%, the expandable beads tend to have more excellent molding processability into a molded body.

Although it is generally difficult to achieve flame retardancy because the expandable beads contain a large amount of air when the expanding magnification is higher, the expandable beads of the present invention satisfy flame retardancy of V-1 or greater as measured according to the UL-94 vertical test (20 mm vertical burn test) in the UL standards even when the expanding magnification is high. The UL-94 vertical test (20 mm vertical burn test) in the UL standards is a measuring method used for an index of flame retardancy in not a general resin expanded body but an unexpanded resin to which flame retardancy is easily applied as compared with the resin expanded body. Specifically, a test specimen having a specific size is perpendicularly attached to a clamp, flame contact is performed for 10 seconds by 20 mm flame, and the test specimen is evaluated as V-0, V-1, V-2, and incompatible according to a flame burn duration, the presence or absence of burning to a position of a fixing clamp, and the presence or absence of cotton ignition caused by a burn falling object, or the like.

The expandable beads of the present invention satisfy flame retardancy of V-1 or greater as measured according to the UL-94 vertical test (20 mm vertical burn test) in the UL standards, and thereby the expandable beads can be used as an alternative material in a member which conventionally and mainly uses an unexpanded resin and a metal and requires high flame retardancy, and obtain weight reduction and excellent molding processability to the molded body simultaneously with flame retardancy.

The expandable beads of the present invention may be made of a base material resin. The base material resin may contain a thermoplastic resin, a thermosetting resin, a flame retardant, and a rubber component or the like.

Examples of the thermoplastic resin contained in the base material resin include polyolefin resins such as polyethylene, polypropylene, and EVA (an ethylene-vinyl acetate copolymer), polyvinyl alcohol, polyvinyl chloride, polyvinylidene chloride, an ABS (acrylonitrile-butadiene-styrene) resin, an AS (acrylonitrile-styrene) resin, polystyrene resins, methacryl resins, polyamide resins, polycarbonate resins, polyphenylene ether resins, polyimide resins, polyacetal resins, polyester resins, acrylic resins, cellulose resins, thermoplastic elastomers such as styrene, polyvinyl chloride, polyurethane, polyester, polyamide based, 1,2-polybutadiene, and fluoride rubber thermoplastic elastomers, thermoplastic engineering plastics such as polyamide, polyacetal, polyester, and fluoride thermoplastic engineering plastics, and a powder rubber. These may be used alone or in combination. Modified and cross-linked resins may be used as long as the object of the present invention is not deteriorated. Examples of the thermosetting resin contained in the base material resin include phenol resins, amino resins such as a urea resin and a melamine resin, unsaturated polyester resins, and epoxy resins.

Of these, the thermoplastic resins containing the polyphenylene ether resins or the polycarbonate resins are preferable in terms of improvement in flame retardancy.

The polycarbonate resin is preferably a carbonate ester resin derived from bisphenols and phosgene (or diphenyl carbonate), and characterized by a high glass transition point and heat resistance. Polycarbonates derived from 2,2'-bis(4-hydroxyphenyl)propane(bisphenol A), 2,2'-bis(4-hydroxyphenyl)butane(bisphenol B), 1,1'-bis(4-hydroxyphenyl)ethane, bis(4-hydroxyphenyl)methane(bisphenol F), 1,1-bis(4-hydroxyphenyl)cyclohexane, 1,1-bis(4-hydroxyphenyl)

cyclopentane, 1,1-bis(4-hydroxyphenyl)-1-phenylmethane, 1,1-bis(4-hydroxyphenyl)-1-phenylethane, and 1,2-bis(4-hydroxyphenyl)ethane or the like are suitable as the polycarbonate resins. These polycarbonates generally have a glass transition point (Tg) of 140 to 155° C.

The polycarbonate resin can be mixed with one or more other resin, and examples thereof include a polyethylene resin, a polypropylene resin, an acrylonitrile-butadiene-styrene copolymer (ABS resin), a polystyrene resin, polyethylene terephthalate, polybutylene terephthalate, an acrylonitrile-styrene copolymer (AS resin), syndiotactic polystyrene, polyphenylene oxide, polyacetal, polymethylmethacrylate, polyphenylene sulfide, polyethersulfone, polyarylate, polyamide, polyimide, or polyethylenenaphthalate.

When the polycarbonate resin is mixed with the other resin, a content of the polycarbonate resin is preferably equal to or greater than 50% by mass, and more preferably equal to or greater than 70% by mass in respect of flame retardancy.

Herein, the polyphenylene ether resin means a polymer represented by the following formula (1). Herein, $R^1$, $R^2$, $R^3$, and $R^4$ in the formula (1) respectively and independently represent hydrogen, halogen, an alkyl group, an alkoxy group, a phenyl group, or a haloalkyl group having at least two carbon atoms between halogen and a benzene ring in the formula (1) or a haloalkoxy group containing no third α-carbon. n is an integer representing a degree of polymerization.

[Chemical Formula 1]

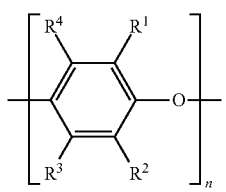

(1)

The polyphenylene ether resin preferably has a weight-average molecular weight of 20,000 to 60,000.

Examples of the polyphenylene ether resin include, but are not limited to, poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dibutyl-1,4-phenylene)ether, poly(2,6-dilauryl-1,4-phenylene)ether, poly(2,6-diphenyl-1,4-diphenylene)ether, poly(2,6-dimethoxy-1,4-phenylene)ether, poly(2,6-diethoxy-1,4-phenylene)ether, poly(2-methoxy-6-ethoxy-1,4-phenylene)ether, poly(2-ethyl-6-stearyloxy-1,4-phenylene)ether, poly(2,6-dichloro-1,4-phenylene)ether, poly(2-methyl-6-phenyl-1,4-phenylene)ether, poly(2,6-dibenzyl-1,4-phenylene)ether, poly(2-ethoxy-1,4-phenylene)ether, poly(2-chloro-1,4-phenylene)ether, and poly(2,6-dibromo-1,4-phenylene)ether. Of these, it is particularly preferable that $R^1$ and $R^2$ are alkyl groups having 1 to 4 carbon atoms and $R^3$ and $R^4$ are hydrogen or an alkyl group having 1 to 4 carbon atoms. These may be used alone or two or more kinds of them may be used in combination.

Of the above-mentioned thermoplastic resins, the polyphenylene ether resin is more preferable because the polyphenylene ether resin has excellent flame retardancy and heat resistance. In particular, the polyphenylene ether resin can increase a deflection temperature under load (HDT), maintain rigidity under a high temperature environment, and improve dimensional stability.

The polyphenylene ether resin can be mixed with one or more kinds of other resin, and examples thereof include a polystyrene resin, a polyolefin resin represented by polypropylene, an engineering plastic resin represented by polyamide, and a super-engineering plastic resin represented by polyphenylene sulfide. Of these, the polyphenylene ether resin is preferably mixed with the polystyrene resin in respect of improvement in processability.

Herein, the polystyrene resin means a copolymer primarily containing styrene and a styrene derivative in addition to a homopolymer of styrene and a styrene derivative. Examples of the styrene derivative include, but are not limited to, o-methylstyrene, m-methylstyrene, p-methylstyrene, t-butylstyrene, α-methylstyrene, β-methylstyrene, diphenyl ethylene, chlorostyrene, and bromostyrene.

Examples of the polystyrene resin of the homopolymer include polystyrene, poly-α-methylstyrene, and polychlorostyrene. Examples of the polystyrene resin of the copolymer include, but are not limited to, terpolymers such as ABS and a butadiene-acrylonitrile-α-methylbenzene copolymer in addition to a styrene-butadiene copolymer, a styrene-acrylonitrile copolymer, a styrene-maleic copolymer, a styrene-maleic anhydride copolymer, a styrene-maleimide copolymer, a styrene-N-phenylmaleimide copolymer, a styrene-N-alkylmaleimide copolymer, a styrene-N-alkylated phenylmaleimide copolymer, a styrene-acrylic acid copolymer, a styrene-methacrylic acid copolymer, a styrene-methyl acrylate copolymer, a styrene-methyl methacrylate copolymer, a styrene-n-alkyl acrylate copolymer, a styrene-n-alkyl methacrylate copolymer, and an ethylvinylbenzene-divinylbenzene copolymer.

Graft copolymers, for example, styrene graft polyethylene, a styrene graft ethylene-vinyl acetate copolymer, (styrene-acrylic acid) graft polyethylene, and styrene graft polyamide or the like are also contained. These may be used alone or two or more kinds of them may be used in combination.

The polystyrene resin preferably has a weight-average molecular weight of 180,000 to 500,000. Herein, the weight-average molecular weight is a weight-average molecular weight calculated by performing measurement by gel permeation chromatography (GPC), and then calculating the peak molecular weight of the chromatogram using a calibration curve obtained by measurement of commercially available standard polystyrene (the calibration curve is prepared by using the peak molecular weight of the standard polystyrene).

A content of the polystyrene resin in the base material resin is not particularly limited, and the content is suitably adjusted and used so that a content of other component is set to a desired value. On the other hand, a content of a polyphenylene ether resin contained in the base material resin is preferably equal to or greater than 40% by mass, and more preferably equal to or greater than 50% by mass in respect of flame retardancy.

In order to achieve sufficient flame retardancy, it is preferable to further add the flame retardant into the base material resin.

Examples of the flame retardant include an organic flame retardant and an inorganic flame retardant. Examples of the organic flame retardant include a halogen based compound represented by a bromine compound, and a non-halogen based compound represented by a phosphorus based compound and a silicone based compound; and examples of the inorganic flame retardant include a metal hydroxide represented by aluminium hydroxide and magnesium hydroxide, and an antimony based compound represented by antimony trioxide and antimony pentoxide.

Although the above-mentioned flame retardant is preferably the non-halogen based flame retardant from the viewpoint of environment, and more preferably the phosphorous and silicone based flame retardants, the flame retardant is not limited thereto.

A flame retardant containing phosphorus or a phosphorus compound can be used for the phosphorous based flame retardant. Examples of phosphorous include red phosphorus. Examples of the phosphorus compound include a phosphate ester, and a phosphazene compound group having a bond of a phosphorous atom and a nitrogen atom in a main chain. Examples of the phosphate ester include trimethylphosphate, triethylphosphate, tripropylphosphate, tributylphosphate, tripentylphosphate, trihexylphosphate, tricyclohexylphosphate, triphenylphosphate, tricresylphosphate, trixylenylphosphate, cresyldiphenylphosphate, dicresylphenylphosphate, dimethylethylphosphate, methyldibutylphosphate, ethyldipropylphosphate, hydroxyphenyldiphenylphosphate, and resorcinolbisdiphenylphosphate. Compounds obtained by modifying these with various types of substituents, and various types of condensed-type phosphate ester compounds are also contained. Of these, triphenylphosphate, and the phosphate ester compound represented by the formula (2) are preferable in respect of heat resistance, flame retardancy, and an expanding property.

There may be used various flame retardants and flame retarding auxiliary agents which have been conventionally known, for example, a cyclic nitrogen compound, and examples thereof include a compound having a triazine skeleton such as melamine, ammelide, ammeline, benzoguanamine, succinoguanamine, melamine cyanurate, melam, melem, meton, and melon, a sulfate thereof, an alkali metal hydroxide or an alkali earth metal hydroxide such as magnesium hydroxide and aluminium hydroxide containing crystal water, a zinc borate compound, and a zinc stannate compound. Not only one kind of compound but also the combined plurality of compounds may be contained.

A rubber component is more preferably contained in the base material resin in respect of improvement in an expanding property.

Examples of the rubber component include, but are not limited to, butadiene, isoprene, and 1,3-pentadiene. These are preferably dispersed in a particle form in a continuous phase made of the polystyrene resin. As a method for adding these rubber components, the rubber components themselves may be added, and resins such as a styrene based elastomer and a styrene-butadiene copolymer may be used as a rubber component supply source. In the case of the latter, a ratio (R) of the

[Chemical Formula 2]

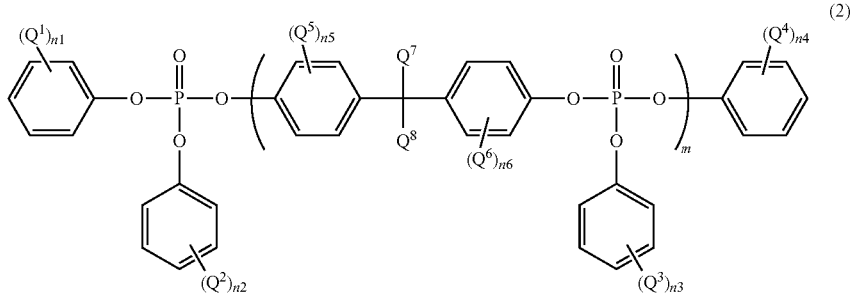

(2)

Herein, in the formula (2), $Q^1$ to $Q^8$ each independently represent hydrogen, halogen, an alkyl group, an alkoxy group, and a phenyl group. Hydrogen or a methyl group is preferable in $Q^1$ to $Q^4$ in the formula (2). Hydrogen is preferable in $Q^5$ and $Q^6$ in the formula (2), and a methyl group is preferable in $Q^7$ and $Q^8$. m in the formula (2) is an integer equal to or greater than 1. The phosphate ester compound may be a mixture of m-mers. n1 to n4 in the formula (2) each independently represent an integer of 1 to 5. n5 and n6 each independently represent an integer of 1 to 4.

(Mono- or poly-)organosiloxanes can be used for the silicone based flame retardant. Examples of the (mono- or poly-) organosiloxanes include mono-organosiloxanes such as dimethyl siloxane and phenylmethyl siloxane, and organopolysiloxanes such as polydimethyl siloxane and polyphenylmethyl siloxane obtained by polymerizing these, and a copolymer thereof. A bonding group of a main chain or a branched side chain is, but is not limited to, hydrogen or an alkyl group and a phenyl group in the case of the organopolysiloxane, and preferably the phenyl group, a methyl group, an ethyl group, and a propyl group. A hydroxyl group, an alkoxy group, an alkyl group, and a phenyl group are used as a terminal bonding group. Shapes of silicones are not also particularly limited, and optional silicones such as an oil-form, a gum-form, a varnish-form, a powder-form, and a pellet-form can be used.

rubber component can be calculated by the following formula.

$R = C \times Rs/100$

C: rubber concentration in rubber component supply source (% by mass)
Rs: content of rubber supply source in base material resin (% by mass)

In addition to the above-mentioned rubber components, other thermoplastic resin, an antioxidant, a heat stabilizer, a lubricant, a pigment, a dye, a weatherability improver, an antistatic agent, an impact resistance modifier, a glass bead, an inorganic filler, and nucleic agents such as talc may be added as long as the object of the invention is not deteriorated.

The expandable beads of the present invention are most preferably comprise the base material resin including the polyphenylene ether resin, the polystyrene resin, the flame retardant, and the rubber component. The expandable beads preferably comprises 40 to 94% by mass of the polyphenylene ether resin, 5 to 20% by mass of the flame retardant, 0.3 to 10% by mass of the rubber component, and the rest being the polystyrene resin, as the contents of the components in this case.

When the content of the polyphenylene ether resin is equal to or greater than 40% by mass, heat resistance is excellent, and flame retardancy, particularly, resin dripping prevention performance during burning is remarkably improved. Although it is important to (1) shorten a burn time and (2)

increase the heat resistance of the resin (prevent softening) in order to prevent resin dripping during burning, it is an opposite effect for the item (2) to merely increase an amount of the flame retardant to be added, and the content of the polyphenylene ether resin is preferably equal to or greater than 40% by mass in order to prevent resin dripping in a thin sample.

On the other hand, when the content of the polyphenylene ether resin is greater than 94% by mass, a temperature required for processes such as expanding and molding is rapidly increased, which not only increases utility cost but also requires special equipment, thereby lacking in actual productivity.

A content of the polyphenylene ether resin in the base material resin is more preferably 45 to 90% by mass, and still more preferably 50 to 85% by mass. An expanding temperature and a molding temperature are further lowered while heat resistance is maintained by setting the content to 45 to 90% by mass, and thereby the base material resin is further likely to be processed.

A content of the flame retardant in the base material resin is preferably 5 to 20% by mass. When the content of the flame retardant is equal to or greater than 5% by mass, desired flame retardancy is likely to be exhibited. On the contrary, when the content is equal to or less than 20% by mass, a plasticization effect of the base material resin is moderately caused by the flame retardant, and thereby heat resistance is improved. Furthermore, an elongational viscosity of the resin during expanding is improved to increase an expanding magnification, and the closed cell ratio of the expandable beads is improved to cause excellent molding processability to the molded body. Thus, it is very important to adjust a balance between flame retardancy and an expanding property.

A content of the rubber component in the base material resin is preferably 0.3 to 10% by mass, more preferably 0.5 to 8% by mass, and still more preferably 1 to 5% by mass. When the content is equal to or greater than 0.3% by mass, desired flame retardancy is likely to be exhibited. Furthermore, when the content is equal to or greater than 0.5% by mass, the resin has excellent flexibility and elongation, and an expanding cell membrane is unlikely to be broken during expanding, which increases an expanding magnification and produces the expandable beads having excellent molding processability after expanding. Although a greater amount of polyphenylene ether resin and flame retardant are preferably added when importance is attached to flame retardancy, both the polyphenylene ether resin and the flame retardant have an adverse effect on an expanding property when amounts thereof to be added are increased. In such a composition, the rubber component is suitable in order to apply an expanding property. This is particularly important in bead expanding for gradually increasing a temperature from room temperature to expand a resin in a non-molten state, and is greatly different from extrusion expanding in which a resin of a molten state is expanded. A bead expanded product which can be molded by filling a desired metal mold with the bead expanded product is more advantageous than an extrusion expanded product extruded in a flat plate form in respect of a degree of freedom of a shape of a molded product, and the expandable beads very advantageously achieve both flame retardancy and high expanding.

On the other hand, when the content of the rubber component is equal to or less than 10% by mass, desired flame retardancy is likely to be exhibited. Furthermore, the content is equal to or less than 8% by mass, sufficient heat resistance is obtained. A shape of a rubber particle is not particularly limited, and a so-called salami structure may be formed, in which a plurality of polystyrene resin fine particles are contained in a particle having an outer shell containing a rubber component. A so-called core shell structure may be formed, in which a singular styrene resin fine particle is contained in a particle having an outer shell containing a rubber component. Although a rubber particle diameter of the rubber component is not particularly limited, the rubber particle diameter is preferably 0.5 to 5.0 μm in the case of the salami structure and 0.1 to 1.0 μm in the case of the core shell structure. In these ranges, a more excellent expanding property is likely to be exhibited.

It is preferable that the polystyrene resin is suitably adjusted and used so that the above-mentioned other component is set to a desired content.

Although a shape of the base material resin is not particularly limited, examples thereof include a bead-form, a pellet-form, a sphere-form, and an indeterminate crushed product. A size thereof is preferably 0.2 to 5.0 mm, and more preferably 0.2 to 3.0 mm. When the size is in this range, the beads after expanding have a moderate size, are likely to be treated, and are likely to be more densely filled during molding.

A residual concentration of an aliphatic hydrocarbon gas remaining in the expandable beads of the present invention is preferably equal to or less than 1000 ppm by volume. Herein, the residual concentration of the aliphatic hydrocarbon gas is a value (ppm by volume) obtained by dividing a volume of the aliphatic hydrocarbon gas contained in the expandable beads by a volume of expandable beads, and 1 ppm by volume (hereinafter, merely referred to as "ppm") corresponds to 0.0001% by volume.

Examples of the aliphatic hydrocarbon gas include propane, n-butane, i-butane, n-pentane, i-pentane, and neopentane. When the residual concentration of the aliphatic hydrocarbon gas is equal to or less than 1000 ppm, a pilot flame is not generated for a long time during burning (referred to as growing). In burn tests such as the UL-94, a growing time is specified in addition to a burn time, and when an amount of the above-mentioned residual gas is small, it is possible to clear the burn test, particularly, the standard of V-0.

Next, a production method for expandable beads of the present invention will be described.

The expandable beads of the present invention can be obtained by incorporating (impregnating) an expanding agent in a base material resin (impregnating step), and expanding the base material resin (expanding step).

In the impregnating step, a method for incorporating the expanding agent in the base material resin is not particularly limited, and a method to be generally performed can be applied. Examples of the method for incorporating the expanding agent include a method performing in a water medium utilizing suspension systems such as water (suspension impregnating), a method using thermal decomposition type expanding agents such as sodium hydrogen bicarbonate (expanding agent decomposition method), a method setting a gas to an atmosphere equal to or greater a critical pressure to bring about a liquid phase state, and bringing the liquid phase into contact with the base material resin (liquid phase impregnating), and a method bringing a base material resin into contact with a gas in a vapor phase state under a high-pressure atmosphere less than a critical pressure (vapor phase impregnation). Of these, particularly, the method carrying out vapor phase impregnation under a high-pressure atmosphere less than a critical pressure is preferable. The method carrying out vapor phase impregnation improves solubility of a gas to a resin as compared with suspension impregnation carried out under a high temperature condition, and is likely increase the content of the expanding agent. Therefore, a high expanding magnification is likely to be achieved, and cell sizes in the base material resin are also likely to be uniformed. Similarly, because the expanding agent decomposition method is also carried out under a high temperature condition, and the added thermal decomposition type expanding agent is not totally changed to a gas, an amount of a gas to be generated is likely to be relatively decreased. Therefore, the vapor phase impregnation has an advantage to be likely to increase the content of the expanding agent. Facilities such as a pressure resistant apparatus and a cooling apparatus are likely to be made more compact than the liquid phase impregnation, and thereby cost of facility is likely to be kept low.

Although a vapor phase impregnation condition is not particularly limited, an atmosphere pressure is preferably 0.5 to 6.0 MPa. An atmosphere temperature is preferably 5 to 30° C., and more preferably 7 to 15° C. When the atmosphere pressure and the atmosphere temperature are in the above-mentioned ranges, dissolution of a gas to the base material resin is likely to be more efficiently advanced. Particularly, although an amount to be impregnated is increased when the atmosphere temperature is low, an impregnating speed tends to be slow, and although the amount to be impregnated is decreased when the atmosphere temperature is high, the impregnating speed tends to be fast. From the balance, it is preferable to set the above-mentioned atmosphere temperature in order to efficiently advance the dissolution of the gas to the base material resin.

The expanding agent is not particularly limited, and gases generally used can be used. Examples thereof include inorganic gases such as air, carbon dioxide, nitrogen gas, oxygen gas, ammonia gas, hydrogen gas, argon gas, helium gas, and neon gas, fluorocarbons such as trichlorofluoromethane (R11), dichlorodifluoromethane (R12), chlorodifluoromethane (R22), tetrachlorodifluoroethane (R112), dichlorofluoroethane (R141b), chlorodifluoroethane (R142b), difluoroethane (R152a), HFC-245fa, HFC-236ea, HFC-245ca, and HFC-225ca, saturated hydrocarbons such as propane, n-butane, i-butane, n-pentane, i-pentane, and neopentane, ethers such as dimethyl ether, diethyl ether, methyl ethyl ether, isopropyl ether, n-butyl ether, diisopropyl ether, furan, furfural, 2-methylfuran, tetrahydropyran, and tetrahydropyran, ketones such as dimethyl ketone, methyl ethyl ketone, diethyl ketone, methyl n-propyl ketone, methyl n-butyl ketone, methyl i-butyl ketone, methyl n-amyl ketone, methyl n-hexyl ketone, ethyl n-propyl ketone, and ethyl n-butyl ketone, alcohols such as methanol, ethanol, propyl alcohol, i-propyl alcohol, butyl alcohol, i-butyl alcohol, and t-butyl alcohol, carboxylate esters such as methyl ester formate, ethyl ester formate, propyl ester formate, butyl ester formate, amyl ester formate, methyl ester propionate, and ethyl ester propionate, and chlorinated hydrocarbons such as methyl chloride and ethyl chloride.

In respect of flame retardancy, the expanding agent preferably has no inflammability and burn-supporting property, and in respect of safety of a gas, inorganic gases are more preferable. Because the inorganic gases are not easily dissolved in a resin as compared with organic gases such as hydrocarbon, and are likely to be discharged from the resin after an expanding step or a molding step, temporal dimensional stability of a molded product is advantageously more excellent. Furthermore, plasticization of the resin is also hardly caused by a residual gas, and excellent heat resistance is likely to be advantageously exhibited from the earlier stage after molding. Of the inorganic gases, carbon dioxide is preferable in respect of solubility to a resin and easiness of handling, and an amount thereof to be impregnated is preferably 3 to 13% by mass based on the resin. The amount is more preferably 3.5 to 10% by mass.

When the amount of carbon dioxide to be impregnated is equal to or less than 3% by mass, a higher expanding magnification is hardly achieved, and the cell sizes in the base material resin are apt to be varied, which tends to increase variations of the expanding magnifications of the base material resins. When the amount is equal to or greater than 13% by mass, the cell sizes are decreased, and the expanding is excessive, which tends to complicate maintenance of the closed cell ratio.

Although a method for expanding the expandable beads in the expanding step is not particularly limited, examples thereof include a method for opening a base material resin to a low-pressure atmosphere from a high-pressure condition at once to expand a gas dissolved in the base material resin, and a method for heating a base material resin using pressurized water vapor or the like to expand a gas dissolved in the base material resin. Of these, particularly, the method for heating and expanding the base material resin is preferable. This is because the method is likely to uniform the cell sizes in the base material resin as compared with the method for opening the base material resin to a low-pressure atmosphere from a high-pressure condition at once. The method is likely to advantageously control the expanding magnification, particularly a low expanding magnification product.

The resin can be more uniformly and efficiently expanded, for example, by introducing the pressurized water vapor from numerous water vapor vents from a lower part of an expanding furnace, and stirring the resin by a stirring blade. The number of rotations of the stirring blade is preferably 20 to 120 rpm, and more preferably 50 to 90 rpm. When the number of rotations is equal to or less than 20 rpm, the pressurized water vapor does not hit the resin uniformly to tend to complicate expanding control or to cause faults such as blocking. When the number of rotations is equal to or greater than 120 rpm, the beads during expanding are damaged by the stirring blade, and thereby the closed cell ratio tends to be reduced, or a desired expanding magnification tends to be unobtained.

When the expandable beads are expanded to a desired expanding magnification, the expandable beads may be expanded to a desired expanding magnification in one stage in the expanding step, or may be expanded in multistage steps such as secondary expanding and tertiary expanding. When the expandable beads are expanded in the multiple stages, it is preferable to subject reserve beads (referred to as beads or the like which are not subjected to expanding of the final stage) to a pressurizing treatment using the inorganic gas before expanding in each of the stages. Although the gas used for the pressurizing treatment is not particularly limited, the inorganic gas is preferable in respect of flame retardancy or safety of the gas. Examples of the inorganic gas include air, carbon dioxide gas, nitrogen gas, oxygen gas, ammonia gas, hydrogen gas, argon gas, helium gas, and neon gas. Although carbon dioxide gas and air are preferable in respect of easiness of handling and economical efficiency, the inorganic gas is not limited thereto. Although the method for the pressurizing treatment is not also particularly limited, examples thereof include a method for filling a pressurized tank with reserve beads and supplying an inorganic gas to the tank to pressurize the reserve beads.

It is possible to set the residual concentration of the aliphatic hydrocarbon gas remaining in the expandable beads to be equal to or less than 1000 ppm, for example, using the inorganic gas as the expanding agent, or through an "aging step" of leaving the expandable beads for a long time under a high temperature (for example, the high temperature can be optionally set at 40° C. to 80° C.) condition to release the remaining gas.

For the expandable beads of the present invention, the molded body can be obtained using a general molding method (molding step).

Examples of the molding method include, but are not limited to, a method for filling a molding die with expandable beads in a molding step, fusing the beads simultaneously with heat of the expandable beads to expand the expandable beads, and thereafter cooling and solidifying the beads, thereby performing molding. Examples of a method for filling the expandable beads include, but are not limited to, a cracking method for filling a metal mold with expandable beads in a state where the metal mold is measurably opened during filling, a compressing method for compressing expandable beads in a state where a metal mold is kept closed for filling of the pressurized beads, and a compression cracking method for performing cracking after filling of compressed beads.

It is preferable to perform a pressurizing step of performing a pressurizing treatment under an inorganic gas atmosphere before filling of the expandable beads. This is because a certain gas pressure can be applied to air bubbles in the expandable beads by performing the pressurizing treatment, and the expandable beads are likely to be more uniformly expanded and molded. Although a pressure source in the case of carrying out the pressurizing treatment is not particularly limited, it is preferable to use an inorganic gas in respect of the above-mentioned flame retardancy, heat resistance, and dimensional stability. Examples of the inorganic gas include air, carbon dioxide, nitrogen gas, oxygen gas, ammonia gas, hydrogen gas, argon gas, helium gas, and neon gas, and although the inorganic gas is preferably carbon dioxide gas or air in respect of easiness of handling and economical efficiency, the inorganic gas is not limited thereto. Although the method for the pressurizing treatment is not also particularly limited, examples thereof include a method for filling a pressurized tank with expandable beads and supplying an inorganic gas into the tank to pressurize the expandable beads.

When the expandable beads of the present invention are used, a molded body having a fine shape or a complicated shape can be also produced by a known inmold forming method, and a width of usable application is enlarged.

For example, the expandable beads are molded by a decompression molding method (for example, Japanese Patent Publication No. 46-38359), which uses a pair of molding dies for inmold forming conventional expandable beads, fills a molding die cavity with the expandable beads under a pressurized atmosphere pressure or a reduced pressure, closes the dies, compresses the molding die cavity so that a volume of the molding die cavity is decreased by 0 to 70%, and thereafter supplies heat media such as water vapor into the dies to heat the expandable beads, thereby heat fusing the expandable beads; and a pressure molding method (for example, Japanese Patent Publication No. 51-22951) or the like which previously subjects expandable beads a pressurizing treatment using a pressure gas to increase a pressure in the expandable beads to enhance a secondary expanding property of the expandable beads, fills a molding die cavity with the expandable beads under an atmosphere pressure or a reduced pressure while maintaining the secondary expanding property, closes dies, and thereafter supplying heat media such as water vapor into the dies to heat the expandable beads, thereby heat fusing the expandable beads.

Molding can be performed by a compression filling casting method for filling a cavity pressurized to an atmosphere pressure or greater by a compressed gas with expandable beads pressurized to the pressure or greater, and thereafter supplying heat media such as water vapor into the cavity to heat the expandable beads, thereby heat fusing the expandable beads (Japanese Patent Publication No. 4-46217). In addition, molding can be also performed by a pressureless filling molding method (Japanese Patent Publication No. 6-49795) which fills a cavity of a pair of molding dies with expandable beads obtained under a special condition and having a high secondary expanding power under an atmosphere pressure or a reduced pressure, and thereafter supplies heat media such as water vapor to heat the expandable beads, thereby heat fusing the expandable beads, or a method obtained by combining the above-mentioned methods (Japanese Patent Publication No. 6-22919).

Although the expanding magnification of the molded body using the expandable beads of the present invention is not particularly limited, the expanding magnification is preferably 1.5 to 40 cc/g, and more preferably 2 to 25 cc/g. When the expanding magnification is in a range of 1.5 to 40 cc/g, excellent flame retardancy tends to be likely to be maintained while making a merit of weight reduction.

Although a rate of dimensional change by heating in the above-mentioned molded body is not particularly limited, the rate of dimensional change by heating is preferably equal to or less than 10%, more preferably equal to or less than 5%, and still more preferably equal to or less than 3%. Because the molded body has excellent heat resistance when the rate of dimensional change by heating is equal to or less than 10%, the molded body can be applied to a member used under a high-temperature environment, and furthermore the molded body can be stored for a long period of time under a high-temperature environment in summer.

Although a deflection temperature under load (HDT) in the molded body is not particularly limited, the deflection temperature is preferably equal to or greater than 60° C., and more preferably equal to or greater than 70° C. When the deflection temperature is equal to or greater than 60° C., the molded body has excellent heat resistance, and the same effect as the above is obtained.

Because the molded body obtained by using the expandable beads of the present invention has the above characteristics, the molded body can be used for members used under a high-temperature environment and requiring flame retardancy and insulation properties, such as automobile members and various tanks, and since the molded body can be used also for fine and complicated members requiring not only flame retardancy but also accuracy of dimension under a high-temperature environment, such as personal computers and OA equipment, and simultaneously satisfies weight reduction, the molded body is very useful.

EXAMPLES

Next, the present invention will be specifically described by way of examples and comparative examples. However, the present invention should not be construed to be limited to the following examples.

Evaluation methods used in Examples and Comparative Examples will be described later.

(1) Density

After a weight W (g) of an expanded body (expandable beads and a molded body) was measured, a volume V (cc) was measured by a submergence method, and a value W/V (g/cc) obtained by dividing the weight by the volume was defined as density.

(2) Expanding Magnification

After a weight W (g) of an expanded body (expandable beads and a molded body) was measured, a volume V (cc) was measured by a submergence method, and a value V/W (cc/g) obtained by dividing the volume by the weight was defined as an expanding magnification.

(3) Closed Cell Ratio

A true volume (Vx) of expandable beads having a known expanding magnification (cc/g) was measured using an air comparison type gravimeter manufactured by Beckmann AG, and a closed cell ratio: S (%) was calculated by the following formula.

$$S = \frac{Vx - W/\rho}{Va - W/\rho} \times 100 \, (\%) \qquad \text{[Mathematical formula 1]}$$

Vx: true volume of expandable beads (cm$^3$)
Va: volume of expandable beads (expanding magnification× weight) (cm$^3$)
W: weight (g) of expandable beads
ρ: density of base material resin of expandable beads (g/cm$^3$)

(4) Residual Concentration of Aliphatic Hydrocarbon Based Gas

A proper quantity of a sample of expandable beads was charged into a head space bottle, and was heated at a temperature equal to or higher than a sample softening point for about 1 hour. Then, a gas in the head space bottle was quantified with gas chromatography (GC 14B manufactured by Shimadzu Corporation). Helium (He) was used as a career gas, and was controlled in a constant flow mode (about 30 ml/min). A temperature of a column (PorapakQ, 80/100 mesh, 3.2 mmφ×2.1 m) was increased to 50 to 150° C., and was held at 50 to 150° C., and detection was performed by a thermal conduction type detector (TCD). A volume of an aliphatic hydrocarbon gas was calculated from the detected area dimension and an analytical curve produced by a standard gas sample, and a concentration (ppm) of the aliphatic hydrocarbon gas was calculated by dividing the volume of the aliphatic hydrocarbon gas by a volume of the sample of the expandable beads.

(5) Fire Retardancy

A test was performed according to the UL-94 vertical test (20 mm vertical burn test) in the U.S. UL standards to evaluate flame retardancy. Hereinafter, a measuring method will be shown.

The obtained expandable beads were molded into test specimens having a length of 125 mm, a width of 13 mm, and a thickness of 3 mm, and flame retardancy was determined by using the five molded products. The test specimens were perpendicularly attached to a clamp, and flame contact was performed twice for 10 seconds by 20 mm flame. The test specimens were determined as V-0, V-1, V-2, and nonconformance according to burn behaviors thereof. The test specimens which do not correspond to the followings were determined as nonconformance.

V-0: Flame burn durations in both the first and second flame contacts: within 10 seconds; the total of the second flame burn duration and flameless burn time: within 30 seconds; the total of the flame burn times of the five test specimens: within 50 seconds; no sample burning to the position of the fixing clamp; and no cotton ignition caused by a burn falling object.

V-1: Flame burn durations in both the first and second flame contacts: within 30 seconds; the total of the second flame burn duration and flameless burn time: within 60 seconds; the total of the flame burn times of the five test specimens: within 250 seconds; no sample burning to the position of the fixing clamp; and no cotton ignition caused by a burn falling object.

V-2: Flame burn durations in both the first and second flame contacts: within 30 seconds; the total of the second flame burn duration and flameless burn time: within 60 seconds; the total of the flame burn times of the five test specimens: within 250 seconds; no sample burning to the position of the fixing clamp; and cotton ignition caused by a burn falling object.

x: nonconformance (6) Rate of Dimensional Change by Heating

Molded bodies immediately after molding (molded products) were tested according to dimensional stability evaluation/B method of JIS K6767 to evaluate a rate of dimensional change by heating. An evaluation temperature was set to 100° C.

(7) Molding Processability

Flat plate molding of 300 mm×300 mm×17 mm was performed by a molding machine K-68 manufactured by Kurz. A case of obtaining a plate-like sample having a surface having no void and having firmly fused expandable beads was defined as ○, and a case of obtaining a sample having a surface having voids or being incapable of being molded into a plate-like shape was defined as x.

(8) Deflection Temperature Under Load (HDT)

Molded products having a sample size of 12.7 mm×127 mm×6.4 mm were produced according to JIS K7191 flat-wise B method, and a temperature when deflection of 0.34 mm was reached in a temperature increase rate of 2° C./min from 30° C. while a load of 0.45 MPa was applied with an inter-fulcrum distance set to 64 mm was evaluated as HDT.

(9) Average Particle Size

An average particle size of expandable beads was obtained as follows. A major axis and a minor axis of each of the expandable beads were obtained from an optical microscope photograph of the expandable beads, and an average value of the major axis and the minor axis was defined as a particle diameter (mm) of the expandable beads. The above-mentioned particle diameters of the five to ten expandable beads randomly selected were obtained, and an average value thereof was defined as an average particle size (mm).

Example 1

50% by mass of S201A (manufactured by Asahi Kasei Chemicals Corporation) as a polyphenylene ether resin (PPE), 15% by mass of bisphenol A-bis(diphenylphosphate) (BBP) as a non-halogen based flame retardant, 10% by mass of an impact-resistant polystyrene resin (HIPS) having 6% by mass of a rubber concentration so that a rubber component was set to 0.6% by mass, and 25% by mass of GP685 (manufactured by PS Japan) as a general-purpose polystyrene resin (PS) were added, heat melted and kneaded, and then extruded by an extruder to produce base material resin pellets. After the base material resin pellets were put in a pressure-resistant container according to a method described in Example 1 of Japanese Patent Laid-Open No. 4-372630, and a gas in the container was replaced by dry air, carbon dioxide (gas) was injected into as an expanding agent, and the base material resin pellets were impregnated with 7% by weight of carbon dioxide for 3 hours under conditions of a pressure of 3.2 MPa and a temperature of 11° C. The base material resin pellets were expanded by pressurized water vapor in an expanding furnace while the stirring blade was rotated at 77 rpm. An expanding magnification and closed cell ratio of the obtained expandable beads are shown in Table 1. Although a residual concentration of an aliphatic hydrocarbon gas of the expandable beads was measured immediately after expanding, the residual concentration was equal to or less than the detection limit (50 ppm). A pressure of the expandable beads was increased to 0.5 MPa over 1 hour, and then held at 0.5 MPa for 8 hours to perform a pressurizing treatment. After an inmold forming metal mold having water vapor vents was filled with the expandable beads, and the expandable beads were heated by pressurized water vapor to expand and fuse the expandable beads, the expandable beads were than cooled, and took out from the forming metal mold. The measured residual concentration of the aliphatic hydrocarbon gas of the molded product was equal to or less than the detection limit (50 ppm). The molded product had flame retardancy of V-0, and had good heat resistance (Table 1).

Example 2

Evaluation was performed in the same manner as in Example 1 except that an expanding magnification was changed as shown in Table 1. Excellent flame retardancy and heat resistance were exhibited as in Example 1 (Table 1).

Examples 3 to 4

Evaluations were performed in the same manner as in Example 1 except that compositions of components or expanding magnifications were changed as shown in Table 1. Even when a ratio of a polyphenylene ether resin was 45% by mass, excellent flame retardancy and heat resistance were exhibited as in Example 1 (Example 3). Even when the ratio of the polyphenylene ether resin was increased to 60% by mass, better flame retardancy and heat resistance were exhibited while maintaining an excellent expanding property (Example 4).

Example 5

Evaluation was performed in the same manner as in Example 1 except that a rubber concentration of HIPS was changed to 15% by mass and compositions of components or expanding magnifications were changed as shown in Table 1. Even when a composition of a rubber component was increased to 3% by mass, a good expanding property could be applied without impairing heat resistance.

Examples 6 to 14

Evaluations were performed in the same manner as in Example 1 except that a flame retardant was changed to triphenylphosphate (TPP); a rubber concentration of HIPS was changed to 19% by mass; and compositions of components or expanding magnifications were changed as shown in Table 1. All performances of flame retardancy, an expanding property, and heat resistance were not reduced also in various amounts of a flame retardant (Examples 6, 7, and 13) to be added, an expanding magnification (Example 8), an amount of a rubber component (Examples 9 and 12), and a ratio of a polyphenylene ether resin (Examples 10 and 11). No problem was caused in various performances even when using BBP in combination with TPP (Example 14).

Example 15

Evaluation was performed in the same manner as in Example 1 except that n-butane was used as an expanding agent in place of carbon dioxide, and compositions of components or expanding magnifications were changed as shown in Table 1. However, a residual concentration of an aliphatic hydrocarbon gas was measured after aging expandable beads at 80° C. for six months after expanding, and as a result, the residual concentration was 800 ppm. Although a burn time of Example 15 was longer than those of the other examples when performance evaluation of a molded body using the expandable beads was carried out, Example 15 had excellent flame retardancy satisfying the standard of V-1. Example 15 exhibited excellent heat resistance as in the other examples (Table 1).

Example 16

Evaluation was performed in the same manner as in Example 1 except that 85% by mass of FPR3000 (manufactured by Mitsubishi Engineering-Plastics Corporation) as a polycarbonate resin (PC), and 15% by mass of bisphenol A-bis(diphenylphosphate) (BBP) as a non-halogen based flame retardant were used. All performances of flame retardancy, an expanding property, and heat resistance were not reduced even when using the polycarbonate resin for a base material resin (Table 1).

Example 17

Evaluation was performed in the same manner as in Example 16 except that MB3800 (manufactured by Mitsubishi Engineering-Plastics Corporation) was used as the polycarbonate resin (PC/ABS). Excellent flame retardancy and heat resistance were exhibited as in Example 16 (Table 1).

Comparative Examples 1 to 5

Evaluations were performed in the same manner as in Example 1 with compositions of components or expanding magnifications shown in Table 2. HIPS having a rubber concentration of 19% by weight was used. When a ratio of a polyphenylene resin composition was low, flame retardancy was less than V-2 also in a low expanding magnification. Heat dimensional stability was also remarkably inferior (comparative example 1). On the contrary, when a ratio of a polyphenylene ether resin was too high, foreign substances caused by heat deterioration occurred frequently in extrusion in producing the base material resin pellets, and a molded body sufficient for evaluation was not obtained (comparative example 2). When an amount of a flame retardant was too small, flame retardancy was hardly exhibited (comparative example 3), and when the amount thereof was too great, a closed cell ratio of expandable beads was greatly reduced, and a molded body was not obtained (comparative example 4). When a rubber component was not used at all, a cell membrane was broken by shortage of flexibility and elongation of a resin to reduce molding processability, and thereby a good molded product was not obtained (comparative example 5).

Comparative Examples 6 and 7

Evaluations were performed in the same manner as in Example 15 except that an aging period until a residual concentration of an aliphatic hydrocarbon gas was evaluated after expanding was changed. The residual concentration of the aliphatic hydrocarbon gas measured after aging at 40° C. for half a year after expanding was 1320 ppm. Although resin dripping during burning was not generated when flame retardancy of a molded body using the expandable beads was evaluated, the molded body had a long burn time, and was incompatible with the V standard (comparative example 6). Similarly, when an aging temperature was 40° C. and an aging period was three months, the residual concentration of the aliphatic hydrocarbon gas was 15380 ppm, and when flame retardancy of a molded product using the beads was carried out, a sample burned out with flame. Heat dimensional stability of the molded product was also poor (comparative example 7).

Comparative Examples 8 and 9

Evaluations were performed in the same manner as in Example 1 except that unexpanded resins were molded by heat pressing in compositions of components shown in Table 2. Although flame retardancy and heat resistance were good when a polyphenylene ether resin S201A (manufactured by Asahi Kasei Chemicals Corporation) was used as the unexpanded resin, weight reduction was not achieved, and the resin was hard, which complicated molding of the resin into a fine and complicated shape (comparative example 8). Although flame retardancy and heat resistance were good also when a polycarbonate resin MB3800 (manufactured by Mitsubishi Engineering-Plastics Corporation) was used, weight reduction was not achieved, and the resin was hard, which complicated molding of the resin into a fine and complicated shape (comparative example 9).

Comparative Example 10

Evaluation was performed in the same manner as in Example 17 except that a sample size of 300 μm×150 mm×150 mm was produced by heat pressing in compositions of components shown in Table 2. Although an expanded sample having a film shape was expanded, it was difficult to fill a metal mold having a complicated shape with the sample, and it was impossible to mold the sample into a fine and complicated shape.

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| compositions | PC, PC/ABS | % by mass | — | — | — | — | — | — | — | — | — |
| | PPE | % by mass | 50 | 50 | 45 | 60 | 60 | 60 | 60 | 60 | 60 |
| | flame retardant BBP | % by mass | 15 | 15 | 18 | 18 | 18 | — | — | — | — |
| | TPP | | — | — | — | — | — | 11 | 14 | 14 | 14 |
| | PS | % by mass | 25 | 25 | 27 | 12 | 2 | 19 | 16 | 16 | 6 |
| | HIPS | % by mass | 10 | 10 | 10 | 10 | 20 | 10 | 10 | 10 | 20 |
| | rubber component | % by mass | 0.6 | 0.6 | 0.6 | 0.6 | 3 | 1.9 | 1.9 | 1.9 | 3.8 |
| expandable beads | expanding magnification | cc/g | 5 | 10 | 6 | 10 | 10 | 9 | 10 | 15 | 10 |
| | density | g/cc | 0.20 | 0.10 | 0.17 | 0.10 | 0.10 | 0.11 | 0.10 | 0.07 | 0.10 |
| | average particle size | mm | 1.6 | 2 | 1.7 | 2 | 2 | 1.9 | 2 | 2.3 | 2 |
| | closed cell ratio | % | 95 | 91 | 91 | 90 | 90 | 94 | 96 | 95 | 94 |
| | residual concentration of aliphatic hydrocarbon gas | ppm | n.d. | n.d. | n.d. | n.d. | n.d. | n.d. | n.d. | n.d. | n.d. |
| molding processability | | | ○ | ○ | ○ | ○ | ○ | ○ | ○ | ○ | ○ |
| molded body | expanding magnification | cc/g | 6 | 10 | 7 | 11 | 11 | 10 | 10 | 16 | 11 |
| | density | g/cc | 0.17 | 0.10 | 0.14 | 0.09 | 0.09 | 0.10 | 0.10 | 0.06 | 0.09 |
| | residual concentration of aliphatic hydrocarbon gas | ppm | n.d. | n.d. | n.d. | n.d. | n.d. | n.d. | n.d. | n.d. | n.d. |
| | flame retardancy (thickness: 3 mm) | | V-0 | V-0 | V-0 | V-0 | V-0 | V-0 | V-0 | V-0 | V-0 |
| | rate of dimensional change by heating (100° C.) | % | 0.4 | 0.3 | 2 | 0.1> | 0.1 | 0.1> | 0.1> | 0.1> | 0.1> |
| | HDT | °C. | 88 | 77 | 73 | 95 | 93 | 94 | 89 | 82 | 84 |

| | | | Examples | | | | | | | |
|---|---|---|---|---|---|---|---|---|---|---|
| | | | 10 | 11 | 12 | 13 | 14 | 15 | 16 | 17 |
| compositions | PC, PC/ABS | % by mass | — | — | — | — | — | — | 85 | 85 |
| | PPE | % by mass | 65 | 70 | 45 | 50 | 60 | 60 | — | — |
| | flame retardant BBP | % by mass | — | — | — | — | 4 | — | 15 | 15 |
| | TPP | | 18 | 7 | 10 | 30 | 10 | 14 | — | — |
| | PS | % by mass | 5 | 11 | 1 | 10 | 15 | 16 | — | — |
| | HIPS | % by mass | 12 | 12 | 44 | 10 | 11 | 10 | — | — |
| | rubber component | % by mass | 2.3 | 2.3 | 8.4 | 1.9 | 2.1 | 1.9 | — | — |
| expandable beads | expanding magnification | cc/g | 19 | 10 | 6 | 10 | 9 | 10 | 2.5 | 2.8 |
| | density | g/cc | 0.05 | 0.10 | 0.17 | 0.10 | 0.11 | 0.10 | 0.40 | 0.36 |
| | average particle size | mm | 2.5 | 2 | 1.7 | 2 | 1.9 | 2 | 1.3 | 1.4 |
| | closed cell ratio | % | 90 | 92 | 95 | 94 | 90 | 96 | 70 | 71 |
| | residual concentration of aliphatic hydrocarbon gas | ppm | n.d. | n.d. | n.d. | n.d. | n.d. | 800 | n.d. | n.d. |
| molding processability | | | ○ | ○ | ○ | ○ | ○ | ○ | ○ | ○ |
| molded body | expanding magnification | cc/g | 20 | 10 | 7 | 11 | 10 | 11 | 2.5 | 3 |
| | density | g/cc | 0.05 | 0.10 | 0.14 | 0.09 | 0.10 | 0.09 | 0.40 | 0.33 |
| | residual concentration of aliphatic hydrocarbon gas | ppm | n.d. | n.d. | n.d. | n.d. | n.d. | 780 | n.d. | n.d. |
| | flame retardancy (thickness: 3 mm) | | V-0 | V-0 | V-1 | V-0 | V-0 | V-1 | V-0 | V-0 |

TABLE 1-continued

| | | | | | | | | | |
|---|---|---|---|---|---|---|---|---|---|
| rate of dimensional change by heating (100° C.) | % | 0.1> | 0.1> | 6 | 7 | 0.1> | 0.2 | 0.7 | 1 |
| HDT | ° C. | 73 | 103 | 63 | 61 | 92 | 81 | 85 | 70 |

*n.d.: equal to or less than detection limit (50 ppm)

TABLE 2

| | | | Comparative Examples | | | | | | | | | |
|---|---|---|---|---|---|---|---|---|---|---|---|---|
| | | | 1 | 2 | 3 | 4 | 5 | 6 | 7 | 8 | 9 | 10 |
| compositions | PC, PC/ABS | % by mass | — | — | — | — | — | — | — | — | 85 | 85 |
| | PPE | % by mass | 35 | 96 | 60 | 50 | 60 | 60 | 60 | 85 | — | — |
| | flame retardant BBP | % by mass | 20 | 2 | 2 | 35 | 18 | — | — | — | 15 | 15 |
| | TPP | | — | — | — | — | — | 14 | 14 | 15 | — | — |
| | PS | % by mass | 39 | 1 | 28 | 5 | 22 | 16 | 16 | — | — | — |
| | HIPS | % by mass | 6 | 1 | 10 | 10 | — | 10 | 10 | — | — | — |
| | rubber component | % by mass | 1.1 | 0.2 | 1.9 | 1.9 | — | 1.9 | 1.9 | — | — | — |
| expandable beads | expanding magnification | cc/g | 5 | — | 5 | 10 | 10 | 10 | 10 | unexpanded | unexpanded | 3 |
| | density | g/cc | 0.20 | — | 0.20 | 0.10 | 0.10 | 0.10 | 0.10 | — | — | 0.33 |
| | average particle size | mm | 1.6 | — | 1.6 | 2 | 2 | 2 | 2 | — | — | film |
| | closed cell ratio | % | 98 | — | 97 | 24 | 48 | 94 | 91 | — | — | — |
| | residual concentration of aliphatic hydrocarbon gas | ppm | n.d. | — | n.d. | — | — | 1320 | 15380 | — | — | — |
| | molding processability | | ○ | — | ○ | X | X | ○ | ○ | X | X | X |
| molded body | expanding magnification | cc/g | 6 | — | 5 | — | — | 11 | 10 | unexpanded | unexpanded | — |
| | density | g/cc | 0.17 | — | 0.20 | — | — | 0.09 | 0.10 | 1.05 | 1.2 | — |
| | residual concentration of aliphatic hydrocarbon gas | ppm | n.d. | — | n.d. | — | — | 1290 | 15320 | — | — | — |
| | flame retardancy (thickness: 3 mm) | | X | — | X | — | — | X | X | V-0 | V-0 | — |
| | rate of dimensional change by heating (100° C.) | % | 21 | — | 0.1> | — | — | 0.7 | 4 | 0.1> | 0.1> | — |
| | HDT | ° C. | 80 | — | 121 | — | — | 77 | 71 | — | — | — |

*n.d.: equal to or less than detection limit (50 ppm)

INDUSTRIAL APPLICABILITY

The expandable beads of the present invention and the molded body obtained using the expandable beads maintain high flame retardancy simultaneously with weight reduction, and is particularly suitable as automobile members and constructional materials for OA equipment.

The invention claimed is:

1. Expandable beads having
   an average particle size of 0.5 to 10 mm,
   a density of 0.033 to 0.80 g/cc, and
   flame retardancy of V-0 or V-1 as measured according to the UL-94 vertical test (20 mm vertical burn test) in the UL standards,
   wherein a residual concentration of an aliphatic hydrocarbon gas is equal to or less than 1000 ppm by volume, and
   wherein the expandable beads comprise a base material resin comprising a polyphenylene ether resin or a polycarbonate resin, and a flame retardant.

2. The expandable beads according to claim 1, wherein expandable beads comprise a base material resin comprising a polyphenylene ether resin and a flame retardant.

3. The expandable beads according to claim 2, wherein the base material resin further comprises a polystyrene resin.

4. The expandable beads according to claim 3, wherein the base material resin further comprises a rubber component.

5. The expandable beads according to claim 4, wherein the base material resin comprises 40 to 94% by mass of the polyphenylene ether resin, 5 to 20% by mass of the flame retardant, 0.3 to 10% by mass of the rubber component, and the rest being the polystyrene resin.

6. The expandable beads according to claim 1, wherein the flame retardant is a non-halogen based flame retardant.

7. The expandable beads according to claim 1, wherein a closed cell ratio is equal to or greater than 50%.

8. A molded body using expandable beads according to claim 1.

9. The expandable beads according to claim 1, wherein the base material resin comprises a polycarbonate resin and a flame retardant, wherein the content of the flame retardant in the base material resin is 5 to 20% by mass.

* * * * *